(12) United States Patent
Zeulner et al.

(10) Patent No.: US 11,446,874 B2
(45) Date of Patent: Sep. 20, 2022

(54) APPARATUS FOR ADDITIVELY MANUFACTURING OF THREE-DIMENSIONAL OBJECTS

(71) Applicant: CONCEPT LASER GMBH, Lichtenfels (DE)

(72) Inventors: Fabian Zeulner, Lichtenfels (DE); Ralf Hetzel, Bad Staffelstein (DE); Jens Stammberger, Rödental (DE); Alexander Hofmann, Weismain (DE); Pascal Krause, Burgkunstadt (DE); Dagmar Wohlfarth, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 172 days.

(21) Appl. No.: 16/135,332

(22) Filed: Sep. 19, 2018

(65) Prior Publication Data
US 2019/0084238 A1 Mar. 21, 2019

(30) Foreign Application Priority Data
Sep. 19, 2017 (EP) .................................. 17191958

(51) Int. Cl.
*B29C 64/371* (2017.01)
*B33Y 30/00* (2015.01)
(Continued)

(52) U.S. Cl.
CPC ............ *B29C 64/371* (2017.08); *B22F 12/00* (2021.01); *B29C 64/135* (2017.08);
(Continued)

(58) Field of Classification Search
CPC ... B29C 64/371; B29C 64/153; B29C 64/227; B29C 64/135; B33Y 30/00; B33Y 10/00;
(Continued)

(56) References Cited

U.S. PATENT DOCUMENTS

| | | | |
|---|---|---|---|
| 3,324,886 A | * | 6/1967 | Way .................. F16K 31/12 137/625.48 |
| 5,613,575 A | | 3/1997 | Ackermann |

(Continued)

FOREIGN PATENT DOCUMENTS

| DE | 202012013036 U1 | 8/2014 |
|---|---|---|
| DE | 102016203513 A1 | 9/2017 |

(Continued)

OTHER PUBLICATIONS https://www.youtube.com/watch?v=64syRSsO7Pk, viewed on Sep. 10, 2021 (Year: 2013).*

(Continued)

*Primary Examiner* — Jacob T Minskey
*Assistant Examiner* — Caroline Beha
(74) *Attorney, Agent, or Firm* — Dority & Manning, P.A.

(57) ABSTRACT

Apparatus (17, 24) for additively manufacturing of three-dimensional objects by means of successive layerwise selective irradiation and consolidation of layers of a build material which can be consolidated by means of an energy source, with a filter unit (4) adapted to filter residues from at least one stream of process gas (18), characterized by at least one positioning device (1, 25, 28) adapted to at least partly automatically transfer the filter unit (4) or at least a part of the filter unit between a disconnected state in which the filter unit (4) is disconnected from the stream of process gas (18) to a connected state in which the filter unit (4) is connected to the stream of process gas (18).

13 Claims, 2 Drawing Sheets

(51) Int. Cl.
    *B33Y 10/00*         (2015.01)
    *B29C 64/135*     (2017.01)
    *B29C 64/153*     (2017.01)
    *B29C 64/227*     (2017.01)
    *B33Y 40/00*         (2020.01)
    *B22F 12/00*       (2021.01)
    *B22F 10/10*       (2021.01)

(52) U.S. Cl.
    CPC .......... *B29C 64/153* (2017.08); *B29C 64/227* (2017.08); *B33Y 10/00* (2014.12); *B33Y 30/00* (2014.12); *B22F 10/10* (2021.01); *B33Y 40/00* (2014.12)

(58) Field of Classification Search
    CPC ............. B33Y 40/00; B22F 2003/1059; B22F 2003/1056; B01D 46/42
    See application file for complete search history.

(56) References Cited

U.S. PATENT DOCUMENTS

| | | | |
|---|---|---|---|
| 7,364,422 B2 * | 4/2008 | Canossi | B29C 49/4236 425/451.6 |
| 2003/0141239 A1 * | 7/2003 | Strohm | B01D 29/96 210/323.1 |
| 2007/0026145 A1 | 2/2007 | Lindemann et al. | |
| 2015/0239085 A1 * | 8/2015 | Schindler | B23Q 1/25 269/58 |
| 2016/0207147 A1 * | 7/2016 | Van Hassel | B33Y 30/00 |
| 2018/0126650 A1 * | 5/2018 | Murphree | B08B 5/04 |

FOREIGN PATENT DOCUMENTS

| | | |
|---|---|---|
| JP | 2009/538226 A | 11/2009 |
| JP | 2014034161 A | 2/2014 |
| JP | 2015529573 A | 10/2015 |
| JP | 2017/519711 A | 7/2017 |
| WO | 9504698 A1 | 2/1995 |
| WO | 2014029529 A1 | 2/2014 |

OTHER PUBLICATIONS

European Search Report Corresponding to Application No. 17191958 dated Mar. 6, 2018.

Japanese Office Action Corresponding to Application No. 2018027534, dated May 7, 2019.

* cited by examiner

APPARATUS FOR ADDITIVELY MANUFACTURING OF THREE-DIMENSIONAL OBJECTS

CROSS-REFERENCE TO RELATED APPLICATIONS

This application claims priority to European Patent Application serial no. 17 191 958.2 filed Sep. 19, 2017, the contents of which is incorporated herein by reference in its entirety as if set forth verbatim.

The invention relates to an apparatus for additively manufacturing of three-dimensional objects by means of successive layerwise selective irradiation and consolidation of layers of a build material which can be consolidated by means of an energy source, with a filter unit adapted to filter residues from at least one stream of process gas.

Such additive manufacturing apparatuses are well-known from prior art. Due to the irradiation of build material in the build plane, i.e. a plane surface of build material that can be directly irradiated via the energy source, e.g. an energy beam, residues, such as smoke, smolder or non-consolidated build material particles may be generated. To assure that such residues do not negatively affect the manufacturing process, typically, a stream of process gas is generated that can be charged with the residues in that the residues may be guided away from the build plane, e.g. out of the process chamber. Further, a filter unit may be provided to filter the residues from the stream of process gas in that filtered process gas may be reused. The stream of process gas may be generated by a suitable stream generating device generating a stream of process gas, e.g. argon.

Generally, the residues (particles) that are filtered in the filter unit, i.e. separated from the stream of process gas streaming through the filter unit, are, for example, received in a filter chamber of the filter unit. If the amount of residues in the filter chamber reaches a defined fill level, particularly if the filter chamber is full, the filter chamber has to be emptied or exchanged to allow for a continuation of the manufacturing process, in particular for filtering the stream of process gas. Usually, the filter unit has to be separated from the additive manufacturing apparatus to clean the filter chamber or to change the filter chamber of the filter unit. To separate the filter unit from the additive manufacturing apparatus, usually service personnel has to detach at least one connection means connecting the filter unit with the apparatus, e.g. a process gas inlet and/or a process gas outlet of the filter unit. The respective connection means may, for example, be mounted via at least one hose clamp that has to be loosened (fastened) to detach (attach) the connection means to the corresponding connection means of the apparatus or vice versa. The said connection means may be arranged in areas of the additive manufacturing apparatus that are difficult for service personnel to access.

Therefore, the attachment and detachment of the connection means of the filter unit when inserting and/or removing the filter unit, e.g. for maintenance purposes such as cleaning, emptying or exchanging the filter chamber, are laborious and time-consuming. Especially, if the manufacturing process cannot be performed while the filter unit is detached, downtimes of the additive manufacturing apparatus may occur.

Thus, it is an objective to provide an apparatus, wherein the maintenance of the filter unit is improved.

The object is inventively achieved by an apparatus according to claim 1. Advantageous embodiments of the invention are subject to the dependent claims.

The apparatus described herein is an apparatus for additively manufacturing three-dimensional objects, e.g. technical components, by means of successive selective layerwise consolidation of layers of a powdered build material ("build material") which can be consolidated by means of an energy source, e.g. an energy beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is adapted to selectively irradiate a build material layer disposed in the process chamber with at least one energy beam, and a stream generating device, as described before, which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The invention is based on the idea that at least one positioning device is provided, which is adapted to at least partly automatically transfer the filter unit or at least a part of the filter unit between a disconnected state in which the filter unit or at least a part of the filter unit is not connected to (disconnected from) the stream of process gas and a connected state in which the filter unit is connected to the stream of process gas and vice versa. Thus, the filter unit is not connected (disconnected) merely manually to (from) the additive manufacturing apparatus, but the connection state of the filter unit is at least partly automatically changed by at least one positioning device.

Therefore, the filter unit can be transferred between a disconnected state and a connected state via the at least one positioning device at least partly automatically, in particular fully automatically. The disconnected state refers to a state of the filter unit in which the filter unit is not connected to the stream of process gas, i.e. not connected to (disconnected from) the additive manufacturing apparatus in that a stream of process gas generated in (and/or at least partly flowing through) the apparatus is not in fluid connection with the filter unit. The disconnected state of the filter unit refers to a state of the filter unit in which the filter unit may be removed (moved away) from the additive manufacturing apparatus and can be maintained, for example, the filter chamber may be emptied and/or cleaned. The connected state refers to a state of the filter unit in which the filter unit is connected to the stream of process gas, i.e. the filter unit is connected to the additive manufacturing apparatus in that the stream of process gas generated in (and/or at least partly flowing through) the apparatus is in fluid connection with the filter unit.

For the connection of the filter unit with the apparatus at least one connecting means is provided, for example a hose or a pipe, through which the stream of process gas is guided.

The respective connection means of the filter unit can be detachably connected to a corresponding connection means of the apparatus. The positioning device allows for an at least partly automated connection of the filter unit in that time can be saved and work, e.g. for service personnel, can be facilitated. Hence, downtimes of the apparatus can be reduced or avoided.

Further, the filter unit does not have to be entirely connected to or disconnected from the apparatus. It is also possible to change the connection status of at least one part of the filter unit, for example the filter chamber. Thus, the filter unit may be permanently connected to the apparatus, wherein the filter chamber may be detachable from the rest of the filter unit. For the sake of simplicity the term "filter unit" is used throughout this application, wherein it has to be understood that also "at least a part of the filter unit", in particular the filter chamber, may be connected (disconnected) from the apparatus in the same way described with respect to the filter unit. Thus, all features details and advantages described with respect to the filter unit are fully transferable to at least one part of a respective filter unit, e.g. the filter chamber.

According to a first embodiment of the invention, the positioning device comprises a lifting unit adapted to lift the filter unit from the disconnected state to the connected state and adapted to lower the filter unit from the connected state to the disconnected state. According to this embodiment, the positioning device is adapted to lift the filter unit located in a predefined position relative to the additive manufacturing apparatus. In the disconnected state the respective filter unit positioned in the predefined location may be picked up via the positioning device and may be lifted into the connected state. Thus, by lifting the filter unit the respective connection means enabling the connection of the filter unit to the stream of process gas may be attached.

Accordingly, by lowering the filter unit from the connected state to the disconnected state, the connection means may be detached, thereby separating the connection of the filter unit to the stream of process gas. Of course, the lowering of the filter unit from the connected state to the disconnected state may be performed using the effect of gravity on the filter unit. In particular, a controlled lowering of the filter unit may be performed.

To perform the transfer of the filter unit between the disconnected state and the connected state, in particular to lift the filter unit from the disconnected state to the connected state and for a (controlled) lowering of the filter unit from the connected state to the disconnected state, the lifting unit comprises at least one drive means. The drive means may be controlled accordingly to transfer the filter unit between the connected state and the disconnected state, and vice versa, in a driven movement.

The drive means may be built as or comprise at least one hydraulic and/or pneumatic lifting element and/or at least one spindle drive and/or at least one chain drive and/or at least one worm drive. Generally, the selection of the drive means is arbitrary and may be performed with regard to specific parameters of the individual filter unit.

Preferably, the lifting unit may comprise a toggle lever mechanism. A respective toggle lever mechanism may comprise at least two lever arms that are connected via a center pivot point, e.g. a pivot joint. Each of the lever arms is connected to another pivot point, e.g. in a region of the lever arm opposing the center pivot point. By performing a relative movement of the lever arms, the filter unit may be transferred from the disconnected state to the connected state and vice versa.

Therefore, the filter unit may be attached to (or detached from) the toggle lever mechanism in the disconnected state, wherein, dependent on a subsequent movement of the toggle lever mechanism, a transfer of the filter unit between the connected state and the disconnected state is possible. The two lever arms may be arranged essentially vertically to each other, in that one of the lever arms is arranged essentially on top of the other lever arm, wherein the center joint connects both lever arms. Upon a corresponding movement, in particular by increasing the angle between the lever arms, the transition of the filter unit from the disconnected state to the connected state can be performed. Accordingly, by decreasing the angle between the lever arms, the filter unit may be lowered from the connected state to the disconnected state.

Further, the drive means or a drive means, in particular a motor and/or a pneumatic and/or a hydraulic drive, may be connected with the toggle lever mechanism, wherein the drive means is adapted to move the filter unit between the connected state and the disconnected state and vice versa. Thus, the drive means (as described before) or another separate drive means may be coupled with the toggle lever mechanism. The drive means may be adapted to move the toggle lever mechanism in that the angle between the lever arms of the toggle lever mechanism changes. With the filter unit attached to one of the lever arms (in particular the upper lever arm) of the toggle lever mechanism, the driven movement realized by the drive means results in a lifting (or a lowering) of the filter unit and therefore, results in a corresponding movement of the filter unit.

The apparatus can further be improved in that the drive means may be connected to the toggle lever mechanism at the (center) joint between the lever arms. Thus, the drive means may be connected to the toggle lever mechanism by connecting the drive means to the center pivot joint that connects two lever arms of the toggle lever mechanism. Thus, the drive means may, particularly linearly, drive the toggle lever mechanism, wherein one of the lever arms may rotatably be held in place with respect to a pivot joint that may be connected to a fixed structure, for example fixedly connected to the apparatus or another structure. The fixed connection refers to an arrangement of the lever arm in which a rotational movement around the pivot points (the center pivot point and at least one other pivot point) is still possible, but the lever arm may not be laterally moved. The other lever arm may be directly or indirectly connected with the filter unit in the same manner.

According to another embodiment of the apparatus, the lifting unit may comprise at least one holding element, in particular a fork element, adapted to hold the filter unit being transferred, in particular being moved, between the connected state and the disconnected state and vice versa. The positioning device, in particular the lifting unit, may pick up the filter unit using the at least one holding element. Also, the holding unit may comprise respective attaching means to attach (detach) the filter unit in a mount position. Thus, the lifting unit is in contact with the holding element while being transferred from the disconnected state to the connected state and vice versa. The contacting of the filter unit via the holding element of the lifting unit may be regarded as attachment of the filter unit to the lifting unit of the positioning device. The attachment of the filter unit may, in particular be a positive-locking connection or frictional-locking connection.

The holding element may be built as a fork element, e.g. as in a fork lift. The fork element may further at least partly encompass the filter unit, e.g. in side regions of the filter unit, thereby assuring a safe transfer and movement of the filter unit. To move the filter unit from the disconnected state to the connected state, the filter unit is positioned in a defined mount position in which the lifting unit can pick up the filter unit via the at least one holding element. Due to a movement of the holding element induced by the lifting unit, the filter unit is moved together with the holding element and thereby transferred from the disconnected state to the connected state or vice versa.

The holding element may be connected to one of the lever arms of the toggle lever mechanism, in particular to the upper lever arm. The term "upper" refers to the movement direction of the filter unit and/or the ground-level the additive manufacturing apparatus is arranged on. Hence, "upwards" may be defined as the direction in which the filter unit is moved while being transferred from the disconnected state to the connected state. Analogously, while being lowered from the connected state to the disconnected state, the filter unit is moved "downwards". Thus, by having the drive means apply a corresponding force on the toggle lever mechanism, the filter unit may be moved, wherein the holding element holds the filter unit. As the holding element is attached to one of the lever arms, especially the upper lever arm, the holding element and the filter unit are moved, wherein the connection state of filter unit can be controlled.

Hence, a corresponding force applied on the center joint of the toggle lever mechanism via the drive means results in an increase of the angle between the lever arms, wherein the holding element attached to the upper lever arm is lifted. By reducing the applied force on the center joint (or applying a corresponding force in the opposite direction) the angle between the lever arms can be decreased, wherein the holding element attached to the upper lever arm is lowered.

According to another embodiment of the apparatus, the positioning device is self-locking, in particular with the filter unit in the connected state. The term "self-locking" refers to an automated locking of the positioning device in a defined position in a force-free state (if no force is applied via the drive means), e.g. if the capability of the drive means to apply a force that moves the filter unit (or holds the filter unit in place) fails. The positioning device may further be able to set itself into a self-locking position in a force-free state. Thus, with the filter unit in the connected state, a self-locking is assured. The filter unit therefore, is not transferred from the connected state to the disconnected state, e.g. due to gravity.

Preferably, the toggle lever mechanism is used to provide the self-locking property of the positioning device. The connected state of the filter unit is reached after passing the dead center of the toggle lever mechanism (both lever arms in line). Thus, the positioning device remains in a stable position, since for disconnecting the filter unit, i.e. transferring the filter unit from the connected state to the disconnected state, the dead center of the toggle lever mechanism would have to be passed again, for which a force would have to be applied on the toggle lever mechanism. Thus, in a force-free state the positioning device remains self-locking until a corresponding force is applied onto the toggle lever mechanism that is suitable to pass the dead center. Thus, by having the self-locking position of the positioning device with the filter unit in the connected state, it can be assured, that if a failure occurs, the filter unit is not transferred from the connected state to the disconnected state, but remains in the connected state due to the self-locking property of the positioning device. Thus, an undesired disconnection of the filter unit can be prevented that could lead to ambient air entering the stream of process gas via the process gas inlet (outlet), if the connection of the filter unit with the apparatus is separated.

Further, at least one valve element of at least one connection means connecting the apparatus with the filter unit may be at least partly automated, in particular actively controlled by a control unit and/or adapted to open upon contact with the corresponding connection means. Respective connection means may, for example, be hoses or tubes or pipes that may especially function as process gas inlet or process gas outlet. The connection means are used to connect the filter unit to the stream of process gas. By having at least one connection means at least partly automated, it is possible to control the opening (or closing) state of the connection means. For example, the connection means may comprise a valve that can be transferred between an open state and a closed state. The connection means may therefore be closed, if the filter unit has to be separated from the apparatus and opened, if the filter unit is in the connected state and shall be connected to the stream of process gas. The transfer of the valve between the open state and the closed state can be performed in and at least partly automated manner, in particular fully automated.

The respective valve may therefore, be actively controlled, for example, via a control unit, in particular the control unit of the apparatus or a separate control unit, e.g. a control unit assigned to the filter unit. Thus, in a disconnection procedure of the filter unit the respective valve(s) may be closed to assure that certain process parameters are met, in particular an inertization level of the process chamber inside the apparatus. Accordingly, after the filter unit has been attached to the apparatus, in particular the connection of the connection means of the filter unit and the apparatus is established, the respective valve(s) may be opened via the control unit.

It is also possible to have the at least one valve of a connection means open upon contact with the corresponding connection means. Thus, the opening (or closing) state is controlled upon the mechanical contact of two corresponding connection means. Hence, when the filter unit is transferred into the connected state and the respective connection means come in contact, an automated opening of the valves is possible. Also, when the filter unit is transferred from the connected state to the disconnected state and the contact or connection, respectively, of the connection means is separated, an automated closing of the valves is feasible. Self-evidently, an arbitrary combination of manually controlled and/or at least partly automated valves is possible.

The positioning device may further be adapted to move the at least one connection means, in particular a tube or a valve, of the apparatus towards the filter unit, or vice versa, with the filter unit in a mount position. The predefined mount position is defined as the position in which the filter unit is placed to be transferred from the disconnected state to the connected state. Thus, alternatively or additionally to moving the filter unit from the disconnected state to the connected state, at least one connection means can be moved via the positioning device, while the filter unit remains in the mount position or is also moved towards the corresponding connection means. Hence, a combination of a movement of the filter unit and a movement of the at least one connection means is also possible, wherein the positioning device is adapted to move the connection means and the filter unit towards each other to establish a connection of the filter unit with the apparatus.

The filter unit of the apparatus may further be movable, in particular automatically movable. Thus, at least one moving means may be provided that is adapted to move the filter unit. Thus, the filter unit may be moved in an automated manner between the apparatus and at least one process station in which the filter chamber of the filter unit may be emptied, cleaned or changed. It is further possible to have multiple filter units assigned to the same apparatus (multiple filter chambers assigned to one filter unit), wherein the individual filter units (filter chambers) may be moved automatically.

Besides, the invention relates to a positioning device for an apparatus according to one of the preceding claims, wherein the positioning device comprises a lifting unit comprising a toggle lever mechanism adapted to at least partly automatically transfer the filter unit between a disconnected state in which the filter unit is disconnected from the stream of process gas to a connected state in which the filter unit is connected to the stream of process gas.

Additionally, the invention relates to a method for changing a filter unit of an apparatus for additively manufacturing of three-dimensional objects by means of successive layerwise selective irradiation and consolidation of layers of a build material which can be consolidated by means of an energy source, which filter unit is adapted to filter residues from at least one stream of process gas, wherein the filter unit or at least one part of the filter unit is at least partly automatically transferred between a disconnected state in which the filter unit or at least one part of the filter unit is disconnected from the stream of process gas to a connected state in which the filter unit is connected to the stream of process gas.

Self-evidently, all features, details and advantages described with respect to the inventive apparatus are fully transferable to the inventive positioning device and the inventive method for exchanging a filter unit of an additive manufacturing apparatus.

Exemplary embodiments of the invention are described with reference to the FIG. The FIG. are schematic diagrams, wherein FIG. 1 shows an inventive positioning device;

Figure 1:
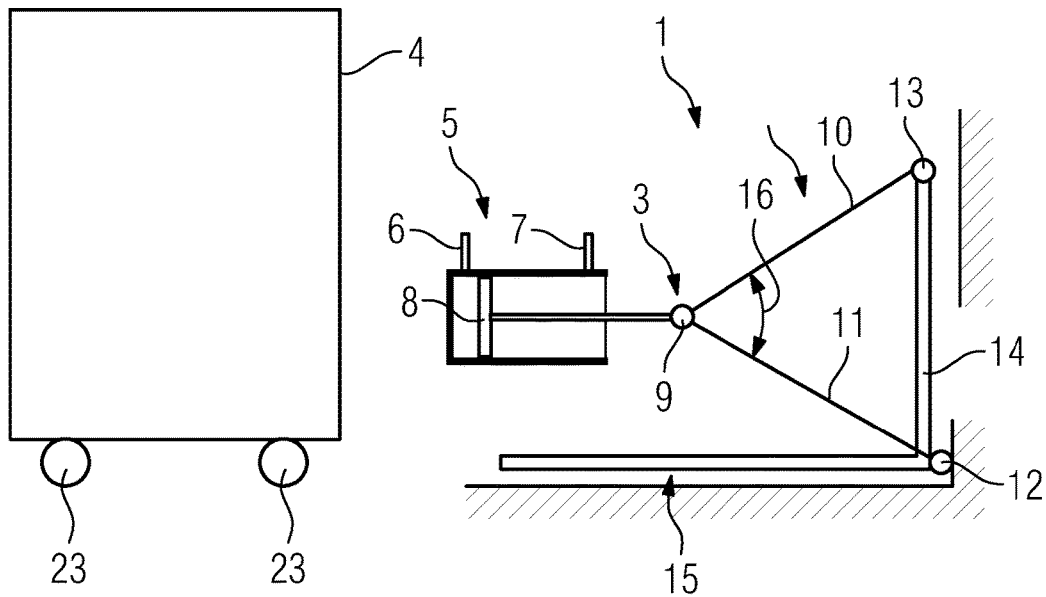

FIG. 1 shows a positioning device 1 for an apparatus 17 for additively manufacturing three-dimensional objects (FIG. 2, 3), which positioning device 1 comprises a lifting unit 2 with a toggle lever mechanism 3 that is adapted to automatically transfer a filter unit 4 (FIGS. 2-4) between a disconnected state (depicted in FIG. 2) in which the filter unit 4 is not connected to (disconnected from) a stream of process gas to a connected state in which the filter unit 4 is connected to the stream of process gas. It is also possible to connect/disconnect a filter chamber of the filter unit 4 separately (not shown).

The positioning device 1 comprises a drive means 5 connected to the toggle lever mechanism 3. The drive means 5 is, for example, built as pneumatic or hydraulic drive means with fluid ports 6, 7. Dependent on the pressure of a fluid applied via the fluid ports 6, 7 a drive element 8 can be positioned. The drive means 5 is coupled to the toggle lever mechanism 3 at a center pivot joint 9. The center joint 9 connects the two lever arms 10, 11 of the toggle lever mechanism 3 with each other. The lever arm 11 is connected to a structure of the apparatus via a joint 12. The lever arm 10, which can be regarded or deemed as "upper" lever arm 10 is connected via a joint 13 with a holding element 14. The holding element 14 is built as fork element, wherein the holding element 14 can partly encompass a filter unit 4 that is arranged in a mount position 15. As mount position 15 a position is referred, in which the holding element 14 can pick up the filter unit 4, as will be described with respect to the FIGS. 2-4 below.

In other words, dependent on the pressure of the fluid that is applied via the ports 6, 7 the drive element 8 will move with respect to the pneumatic cylinder of the drive means 5. Thus, the drive element 8 pushes the center joint 9, thereby increasing an angle 16 between the lever arms 10, 11 of the toggle lever mechanism 3. By increasing the angle 16 the lever arms 10, 11 or the toggle lever mechanism 3 as such, is straightened. Due to the straightening of the toggle lever mechanism 3, the lever arm 10 and the joint 13 are raised with respect to the ground. As the holding element 14 is coupled with the upper lever arm 10, e.g. via the joint 13, the holding element 14 is raised as well.

By applying a corresponding pressure via the port 7 the drive element 8 of the drive means 5 can be moved in the opposite direction, thereby pulling the center joint 9 and decreasing the angle 16 between the lever arms 10, 11. Thus, the corresponding movement results in a lowering of the holding element 14. Of course, any arbitrary drive means 5 can be used, such as a motor or a spindle drive or a worm drive or the like.

Figure 2:
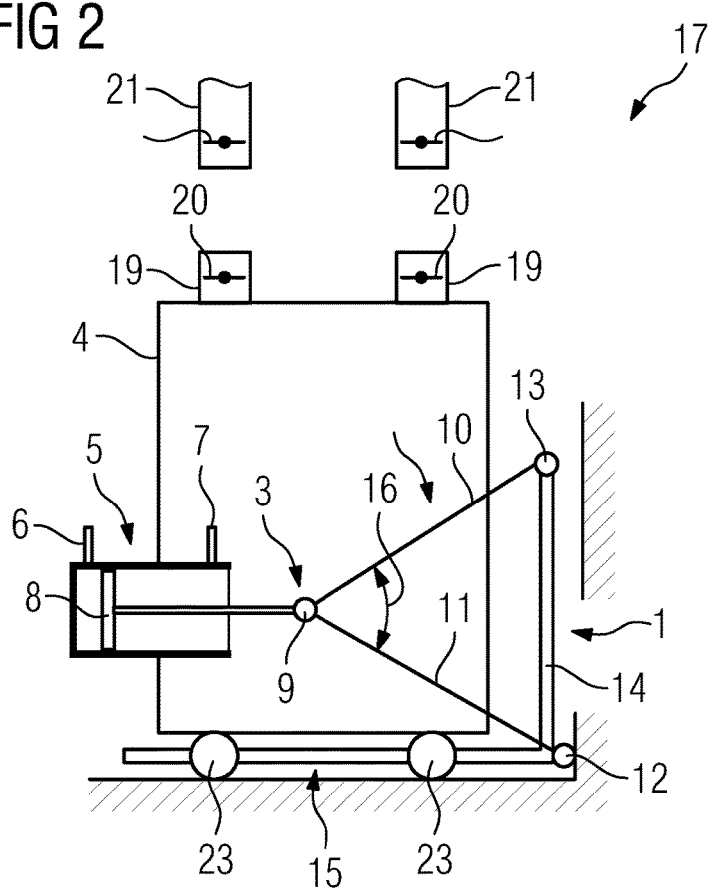
FIG. 2 shows an inventive apparatus according to a first embodiment with a filter unit in a disconnected state.

FIG. 2 shows the apparatus 17 for additively manufacturing of three-dimensional objects. The apparatus 17 comprises a filter unit 4 that is adapted to filter residues generated in the manufacturing process from at least one stream of process gas 18 (cf. FIG. 3). The apparatus 17 comprises the positioning device 1 as depicted in FIG. 1. The positioning device 1 is adapted to automatically transfer the filter unit 4 between a disconnected state (depicted in FIG. 2) in which the filter unit 4 is not connected to (disconnected from) the stream of process gas 18 to a connected state (depicted in FIG. 3) in which the filter unit 4 is connected to the stream of process gas 18.

The filter unit 4 comprises connection means 19 each comprising a valve 20. On the side of the apparatus 17 corresponding connection means 21 are provided comprising valves 22. To connect the filter unit 4 to the stream of process gas 18, the connection means 19 and 21 have to be connected to each other and the valves 20, 22 have to be opened. According to the embodiment depicted in the FIG. 2, 3, the valves 20, 22 open upon contact of the corresponding connection means 19, 21. It is also possible to have the valves 20, 22 actively controlled, wherein a control unit (not shown) may be provided that sends corresponding signals to the valves 20, 22 to transfer the valves 20, 22 between an open state and a closed state.

As shown in FIG. 2 the filter unit 4 is arranged in a mount position 15 in which the holding element 14 can pick up the filter unit 4. As a corresponding pressure is applied via the Port 6 of the drive means 5, the drive element 8 is pressure driven. Thus, the drive element 8 that contacts the joint 9 drives the toggle lever mechanism 3 in that the angle 16 between the lever arms 10, 11 is increased and the upper lever arm 10 is lifted. The upper lever arm 10 is connected with a joint 13 in an area opposing the center area in which the joint 9 is arranged.

As the holding element 14 is coupled with the lever arm 10 via the joint 13 the holding element 14 is lifted due to the movement of the drive element 8 of the drive means 5. In other words, the drive means 5 is adapted to derive the toggle lever mechanism 3 and to induce a movement of the holding element 14. As the holding element 14 is raised via the toggle lever mechanism 3 the holding element 14 comes in contact with a bottom side of the filter unit 4. Thus, the holding element 14 may comprise tines that may pass between roller elements 23 of the filter unit 4.

Figure 3:
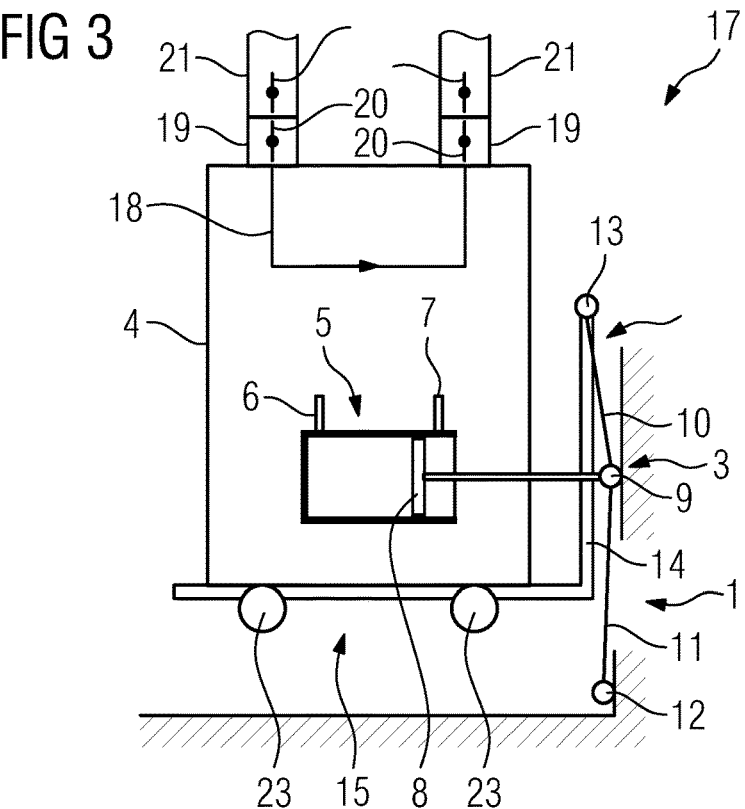
FIG. 3 shows the inventive apparatus of FIG. 2 with the filter unit in a connected state.

As the holding element 14 is further raised, the positioning device 1 lifts the filter unit 4 from the disconnected state (depicted in FIG. 2) to the connected state (depicted in FIG. 3). Thus, the filter unit 4 is lifted, wherein the connection means 19, 21 come in contact with each other. Thus, the connection means 19, 21 may be connected. The valves 20, 22, according to this embodiment, open upon contact, in that the connection of the filter unit 4 with the connection means 20 one of the apparatus 17 is established upon contact. Thus, as depicted in FIG. 3, the filter unit 4 is connected to the stream of process gas 18.

As can further be derived from FIG. 3, the toggle lever mechanism 3 and therefore, the positioning device 1 is arranged in a self-looking position. The connected state of the filter unit 4 is in a position, in which the toggle lever mechanism 3 already passed the dead center. Thus, until a corresponding pressure is applied via the port 7 of the drive means 5 and thus, the drive element 8 applies a corresponding force on the toggle lever mechanism 3, the holding element 14 will not be lowered assuring that the connection between the connection means 19 and 21 remains established.

To disconnect the filter unit 4 from the connection means 21 of the apparatus 17, the valves 20, 22 may be closed (or close upon the disconnection of the connecting means 19, 21). Thus, the filter unit 4 is separated from the stream of process gas 18. Subsequently, a corresponding pressure may be applied via the port 7 thus, the drive element 8 is moved from the state as depicted in FIG. 3 to the state as depicted in FIG. 2, thereby applying a corresponding force on the toggle lever mechanism 3. The joint 9 therefore, passes the dead center in the opposite direction, wherein the lever arm 10 and the joint 13 are lowered. As the holding element 14 is connected with the joint 13 (or the lever arm 10) the holding element 14 is lowered as well. As the holding element 14 carries (or holds) the filter unit 4, the filter unit 4 is lowered together with the holding element 14 until the roller elements 23 of the filter unit 4 touch the ground.

The filter unit 4 can further be moved automatically, in that, e.g. if a filter chamber of the filter unit 4 (not shown) reaches a defined fill level, the filter unit 4 is automatically moved to a process station, in which the filter chamber may be cleaned, emptied or maintained. Inversely, the filter unit 4 may be automatically moved to the mount position 15, from which the positioning device 1 can transfer the filter unit 4 to the connected state, as described before.

Figure 4:
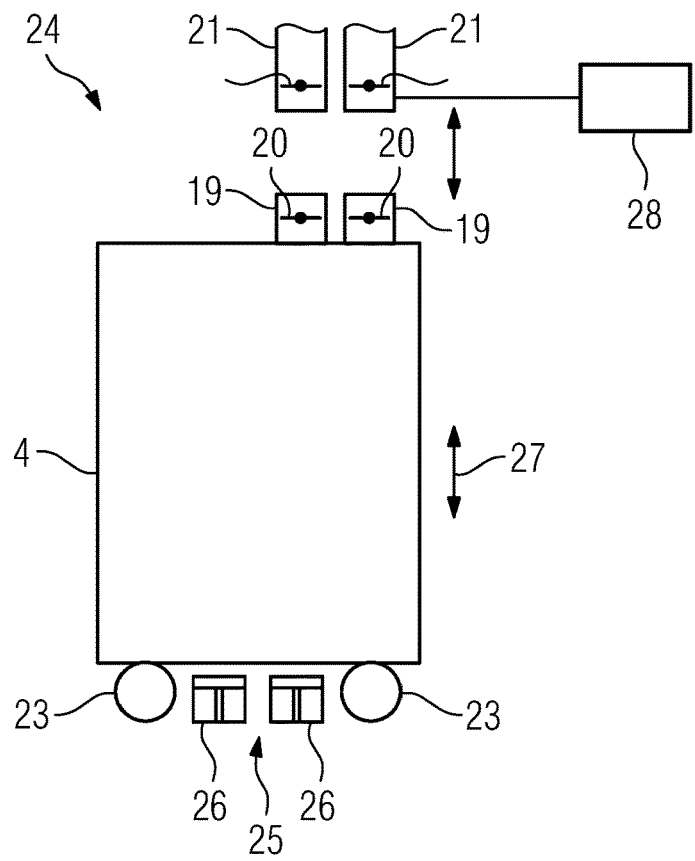
FIG. 4 shows an inventive apparatus according to a second embodiment.

FIG. 4 shows an apparatus 24 according to a second embodiment of the invention, wherein same reference signs are used for same parts. The apparatus 24 comprises a positioning device 25 that comprises two lifting units 26. The lifting units 26 comprise drive means, for example built as hydraulic cylinders. The lifting units 26 are adapted to lift the filter unit 4 between the disconnected state of the filter unit 4 (depicted in FIG. 4) and the connected state (not shown), as depicted by an arrow 27. Additionally, the apparatus 24 comprises a positioning device 28 that is adapted to position the connection means 21, in particular to pull the connection means 21 of the apparatus 24 towards the connection means 19 of the filter unit 4. Thus, a connection between the connection means 19, 21 can be established, as described before.

Of Course, the embodiments depicted in the FIGS. 1-4 can be arbitrarily combined. The inventive method may be performed on the apparatuses 17, 24 as described with respect to the FIGS. 1-4.

The invention claimed is:

1. An apparatus for additively manufacturing of three-dimensional objects by successive layerwise selective irradiation and consolidation of layers of a build material with an energy source, the apparatus comprising:
   a filter unit adapted to filter residues from at least one stream of process gas; and
   at least one positioning device adapted to at least partly automatically transfer at least a part of the filter unit between a disconnected state in which the filter unit is disconnected from the stream of process gas to a connected state in which the filter unit is connected to the stream of process gas by moving a connection device of the filter unit towards at least one corresponding connection device of a functional unit and/or moving at least one corresponding connection device of a functional unit towards the filter unit, thus facilitating fluid connection between the filter unit and the functional unit, wherein the positioning device comprises a lifting unit adapted to lift the filter unit from the disconnected state to the connected state and adapted to lower the filter unit from the connected state to the disconnected state.

2. The apparatus according to claim 1, wherein the lifting unit comprises at least one drive means for lifting the filter unit from the disconnected state to the connected state and for lowering the filter unit from the connected state to the disconnected state.

3. The apparatus according to claim 2, wherein the drive means is built as or comprises at least one hydraulic and/or pneumatic lifting element and/or at least one spindle drive and/or at least one chain drive and/or at least one worm drive.

4. The apparatus according to claim 1, wherein the lifting unit comprises a toggle lever mechanism.

5. The apparatus according to claim 4, wherein the or a drive means is connected with the toggle lever mechanism and adapted to move the filter unit between the connected state and the disconnected state and vice versa.

6. The apparatus according to claim 5, wherein the drive means is connected to the toggle lever mechanism at the joint between a plurality of lever arms.

7. The apparatus according to claim 1, wherein the lifting unit comprises at least one holding element, adapted to hold the filter unit being transferred between the connected state and the disconnected state and vice versa.

8. The apparatus according to claim 7, wherein the holding element is connected to one of a plurality of lever arms.

9. The apparatus according to claim 1, wherein the positioning device is self-locking with the filter unit in the connected state.

10. The apparatus according to claim 1, wherein the valve element connecting the apparatus with the filter unit is at least partly automated by a control unit and/or adapted to open upon contact with the at least one corresponding connection device of the functional unit.

11. The apparatus according claim 1, wherein the positioning device adapted to move the at least one corresponding connection device comprises a tube.

12. The apparatus according to claim 1, wherein the filter unit is moveable.

13. A positioning device for the apparatus according to claim 1, comprising a lifting unit comprising a toggle lever mechanism adapted to at least partly automatically transfer the filter unit or at least one part of the filter unit between a disconnected state in which the filter unit is disconnected from a stream of process gas to a connected state in which the filter unit is connected to the stream of process gas.

\* \* \* \* \*